W. W. FRANTZ.
COMBINED POULTRY ROOST AND VERMIN TRAP.
APPLICATION FILED APR. 28, 1908.
902,393.
Patented Oct. 27, 1908.
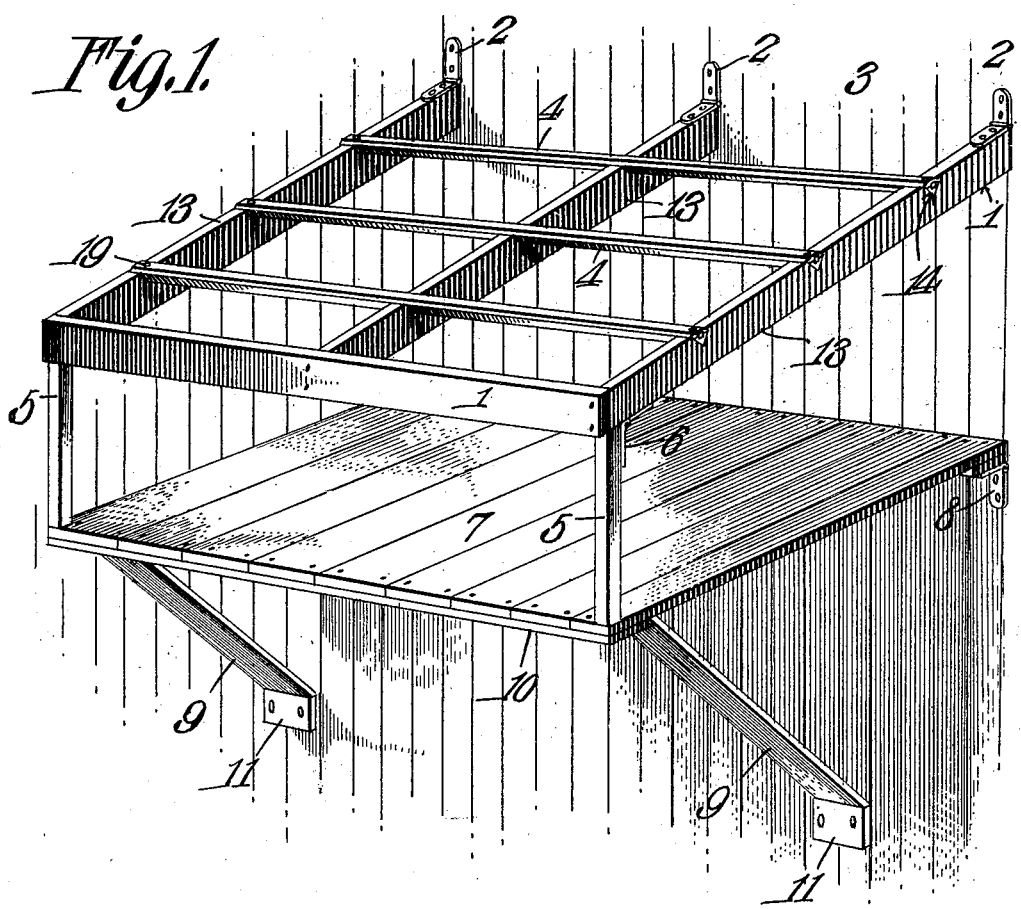
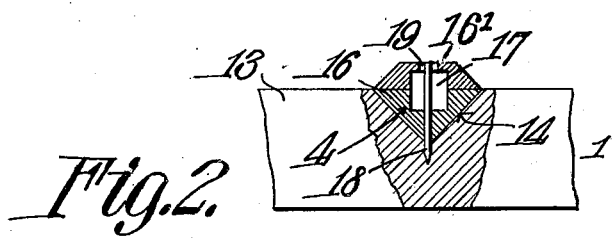
Willis W. Frantz, Inventor

UNITED STATES PATENT OFFICE.

WILLIS W. FRANTZ, OF WAYNESBORO, PENNSYLVANIA.

COMBINED POULTRY-ROOST AND VERMIN-TRAP.

No. 902,393.   Specification of Letters Patent.   Patented Oct. 27, 1908.

Application filed April 28, 1908. Serial No. 429,708.

*To all whom it may concern:*

Be it known that I, WILLIS W. FRANTZ, a citizen of the United States, residing at Waynesboro, in the county of Franklin and State of Pennsylvania, have invented a new and useful Combined Poultry - Roost and Vermin-Trap, of which the following is a specification.

This invention relates to combined poultry roosts and vermin traps, and has for its object to provide an improved structure of this character by means of which the vermin and poultry lice may be readily caught, removed and destroyed.

The invention, also, has for its object to provide perches for poultry which are so constructed as to effectively catch vermin and can be easily taken apart and cleansed.

The invention further has for its object to provide a poultry roost in which the perches are mounted and placed in a stable position and are readily removed and are supported in a frame which is readily folded out of the way when not in use.

The invention consists in a combined poultry roost and vermin trap and in details thereof constructed and arranged as hereinafter set forth and claimed.

In the accompanying drawings:—Figure 1 is a perspective view of a combined poultry roost and vermin trap mounted in position for use on the side of a building. Fig. 2 is a detail view showing in cross section one of the perches.

In carrying out this invention, the perches are so shaped as to be securely held in place in a supporting frame, said supporting frame being adapted to fold up out of the way when not in use. In connection with this supporting frame, there is employed a platform which serves as a support for the perch frame and which is also adapted to be folded up out of the way when not in use.

In carrying out the invention, a perch supporting frame 1 is provided hinged to the side of a building 3, by means of hinges 2 and having mounted on said frame 1 perches 4. The frame 1 is supported in open position by means of legs or standards 5 connected to said frame by hinges 6, said legs 5 folding up against the frames 1 when the latter are folded up against the side of the building 3. The frame 1 is in turn supported through the legs or standards 5 by means of a platform 7 connected to the building 3 by means of hinges 8, so as to be folded down against said building when not in use. Said floor or platform 7 is supported in extended or open position by means of brace bars 9 having their upper ends engaging the bar 10 on the front end of the platform 7 and their lower ends engaging a block or projection 11 on the building 3. When said platform 7 is not in use, the bars 9 may be removed and the platform will be swung down against the side of the building 3. The perches 4 are removably mounted in cross bars 13 on the frame 1 and to prevent them from turning are of angular shape in cross section, said perches 4 resting in V-shaped recesses 14 in the bars 13 of the frame 1. Each perch is formed of two longitudinal strips 16, 16', the lower strip being of triangular form in cross section to fit within the V-shaped grooves, while the upper strip 16' is trapezoidal in cross section, as shown, in order to provide an easy footing for fowls. The opposing faces of the strips are provided with alining grooves 17 to form a longitudinal passageway open at the ends of the perch for the admission of vermin. The upper strip 16' rests loosely upon and is removable from the lower strip 16, and the slight cracks thus formed between the two strips will afford a passage through which the vermin may crawl to the longitudinal groove. In order to hold the upper strip 16' in position on the lower strip 16, steadying pins 18 are provided, which extend down through the lower strip 16 into the cross bar 13, and up through holes 19 in the upper strip 16', the said holes 19 being a little larger than the pins 18, the latter having their upper ends flush with the top of the holes 19.

When the gorged lice leave the poultry in the morning they seek the nearest hiding places and will pass through the minute cracks or passages between the sections 16 and 16' of the roost and down through the openings 19 and also through the open ends of the grooves. By lifting off the upper section 16' of the perch or by lifting the entire perch from the bars 13 and then separating the parts 16, 16', the vermin can be readily removed from the perches and the latter can be washed and cleansed and then replaced in position.

The platform 7 serves as a floor for the poultry and the several parts as hereinbefore described can be readily folded up against the side of the building when not in use.

What is claimed is:—

1. In a poultry roost, a frame having V- shaped grooves, a perch formed of a pair of loosely fitting superposed sections having openings, the lower section fitting within the V-shaped grooves, and pins extending through the openings in both sections and secured in the frame.

2. In a poultry roost, a frame having V-shaped grooves, pins extending upward from the bases of the grooves, and loosely fitting perch sections mounted on the pins, the lowermost section fitting within the grooves, and both sections having longitudinal grooves forming a vermin trap.

3. In a combined poultry roost and vermin trap, a perch formed of two longitudinal sections, the opposing faces of which are provided with longitudinal grooves, the upper section having openings communicating with said grooves, and steadying pins extending through the lowermost section and fitting loosely in the openings in the upper section.

In testimony that I claim the foregoing as my own, I have hereto affixed my signature in the presence of two witnesses.

WILLIS W. FRANTZ.

Witnesses:
WALTER T. TODD,
CHAS. H. WILLIAMS.